US012790415B2

(12) United States Patent
Li et al.

(10) Patent No.: US 12,790,415 B2
(45) Date of Patent: Nov. 10, 2026

(54) (METH)ACRYLATE FUNCTIONAL DISPERSANT

(71) Applicant: Arkema France, Colombes (FR)

(72) Inventors: Ling Li, Exton, PA (US); Thomas W. Hazell, Exton, PA (US); Endrit Shurdha, Exton, PA (US)

(73) Assignee: Arkema France, Puteaux (FR)

( * ) Notice: Subject to any disclaimer, the term of this patent is extended or adjusted under 35 U.S.C. 154(b) by 803 days.

(21) Appl. No.: 18/017,103

(22) PCT Filed: Jul. 23, 2021

(86) PCT No.: PCT/IB2021/000481
§ 371 (c)(1),
(2) Date: Jan. 20, 2023

(87) PCT Pub. No.: WO2022/018510
PCT Pub. Date: Jan. 27, 2022

(65) Prior Publication Data

US 2023/0295353 A1 Sep. 21, 2023

Related U.S. Application Data

(60) Provisional application No. 63/055,546, filed on Jul. 23, 2020.

(51) Int. Cl.
*C08F 20/20* (2006.01)
*C08K 3/22* (2006.01)

(52) U.S. Cl.
CPC ................ *C08F 20/20* (2013.01); *C08K 3/22* (2013.01); *C08F 2810/20* (2013.01); *C08F 2810/30* (2013.01); *C08K 2003/2241* (2013.01)

(58) Field of Classification Search
CPC .. C08F 20/20; C08F 2810/20; C08F 2810/30; C08K 3/22; C08K 2003/2241
See application file for complete search history.

(56) References Cited

U.S. PATENT DOCUMENTS

| | | | |
|---|---|---|---|
| 4,722,947 | A | 2/1988 | Thanawalla |
| 4,871,801 | A | 10/1989 | Sharaby |
| 5,296,334 | A | 3/1994 | Castaldi et al. |
| 2002/0137818 | A1 | 9/2002 | Yu et al. |
| 2018/0010003 | A1 | 1/2018 | Vasudevan et al. |

FOREIGN PATENT DOCUMENTS

| | | | |
|---|---|---|---|
| CN | 102807643 | A | 12/2012 |
| JP | S58221841 | A | 12/1983 |

OTHER PUBLICATIONS

English translation of CN 102807643 (Year: 2012).*
International Search Report—PCT/IB2021/000481—Nov. 25, 2021.

* cited by examiner

*Primary Examiner* — Catherine S Branch
*Assistant Examiner* — Andrea Wu
(74) *Attorney, Agent, or Firm* — Christopher R. Lewis

(57) ABSTRACT

A (meth)acrylate functional copolymer is useful as a dispersant for solid particulates in paints, inks and coatings. The copolymers have (meth)acrylate functionality positioned pendant to the polymer chain. Also positioned pendant to the polymer backbone chain are non-(meth)acrylate-functional hydrophobic and/or hydrophilic pendant groups. The copolymers are useful as dispersants in dispersions of particulate solids in organic media and aqueous media, such in paints and printing inks.

17 Claims, 1 Drawing Sheet

(METH)ACRYLATE FUNCTIONAL DISPERSANT

CROSS-REFERENCE TO RELATED APPLICATIONS

This application is a U.S. national stage application under 35 U.S.C. § 371 of international application number PCT/IB2021/000481, filed Jul. 23, 2021, which claims priority to U.S. patent application No. 63/055,546, filed Jul. 23, 2020.

FIELD OF THE INVENTION

The present invention relates to (meth)acrylate-functional polymers with (meth)acrylate functionality positioned pendant to the polymer chain. Also positioned pendant to the polymer backbone chain are non-(meth)acrylate-functional hydrophobic and/or hydrophilic pendant groups. The polymers are useful as dispersants in dispersions of particulate solids and organic media, such in paints and printing inks.

BACKGROUND

Paints, inks and coatings often comprise a dispersion of solid pigments in an organic or aqueous media. It is necessary for these dispersions to be uniform, such that when the ink or paint dries, a uniform coating of the particles is left on a substrate. These dispersions also need to be stable for long storage times over a wide range of temperatures. Dispersants are used in the fields of paints, inks and coatings to ensure uniform and stable separation of solid pigments in such compositions. A desirable property of such dispersants is the ability to interact with a variety of possible types of pigments, as well as the media in which they are dispersed. The ability to interact with a variety of pigment types is especially desirable, since inks and paints often comprise more than one type pigment particle, each of which may have different surface characteristics. Accordingly, a useful dispersant is compatible with a wide range organic and organic pigment types. Even more desirable is a dispersant that can compatibilize and stabilize such pigments with both organic and aqueous media. Another desirable attribute is a dispersant that will not interfere with curing of an ethylenically unsaturated species other than a (meth)acrylate group that may be present in the ink, coating or paint.

SUMMARY

The present disclosure provides (meth)acrylate-functional polymers with (meth)acrylate functionality positioned pendant to the polymer chain and with hydrophobic and/or hydrophilic pendant groups, also positioned pendant to the polymer chain. The disclosed polymers are useful as dispersants in pigmented systems and as fillers in coatings or inks. The polymers may be used as an adhesion promotor. The novel polymer architecture disclosed herein allows for diverse functionalization for dispersing of organic and/or inorganic pigments in ink, coating or paint formulations. The ink, coating or paint formulations may comprise a variety of pigment types dispersed in organic or aqueous media. Also disclosed is a synthetic method used to create these (meth)acrylate-functional polymers with pendant hydrophobic and/or hydrophilic moieties.

Accordingly, a (meth)acrylate-functionalized polymer comprising, consisting of or consisting essentially of repeating units of structure [A], repeating units of structure [B], and repeating units of structure [C] is provided.

Repeating unit [A] has the following structure:

[A]

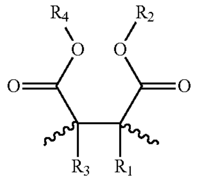

In structure [A], $R_1$ and $R_3$ are the same or different and are H or alkyl, $R_2$ and $R_4$ are different from each other and are either an organic moiety bearing at least one (meth)acrylate functional group or H. Accordingly, structure [A] bears the (meth)acrylate functionality of the (meth)acrylate-functionalized polymer disclosed herein.

Repeating unit [B] has the following structure:

[B]

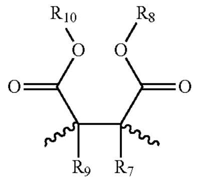

In structure [B], $R_7$ and $R_9$ are the same or different and are H or alkyl. $R_8$ and $R_{10}$ are either both H or are different from each other and are independently selected from:

—$(R_{11}O)_nR_{12}$, wherein $R_{11}$ is a divalent alkylene moiety, $R_{12}$ is H or a C1-C26, in particular C8-C26, alkyl, and n is an integer of 1 or more;

$R_{19}$, wherein $R_{19}$ is a C2-C34, in particular C2-C30, more particularly C8-C26, even more particularly C8-C22, branched or straight chained alkyl;

—$R_{20}$—(C═O)OH wherein $R_{20}$ is a C2-C26, in particular C8-C26 alkylene; or

H.

Preferably, if one of $R_8$ and $R_{10}$ are H, then the other of $R_8$ or $R_{10}$ is one of the other choices.

Repeating unit [C] is:

[C]

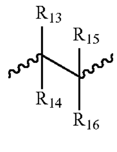

In structure [C], $R_{13}$, $R_{14}$, $R_{15}$, and $R_{16}$ are the same or different and are independently selected from the group consisting of H and organic moieties.

The (meth)acrylate-functional copolymer comprising, consisting of, or consisting essentially of structures [A], [B], and [C] is subject to the proviso that structure [C] is different from structure [A] and structure [B]. The (meth)acrylate-functional copolymer is also subject to the proviso that one or more units of structure [C] are located between at least one of: i) two units of structure [A], ii) two units of structure [B] or iii) one unit of structure [A] and one unit of structure [B]. For avoidance of doubt, this means that in the chain of the (meth)acrylate-functionalized polymer of the invention, there is at least one of the following repeating units: [A][C][A], [B][C][B], or [A][C][B]. Structure [A] is understood to bear the (meth)acrylate functionality of the (meth)acrylate-functionalized polymer.

Also provided is a curable composition comprised of, consisting of or consisting essentially of the (meth)acrylate-functional copolymer.

According to an embodiment, the (meth)acrylate-functionalized polymer may be a reaction product of at least i) an anhydride-functionalized base (meth)acrylate-functionalized polymer, ii) a hydroxyl-functionalized (meth)acrylate, and iii) an alkoxylated long chain aliphatic alcohol.

DETAILED DESCRIPTION

Figure 1:
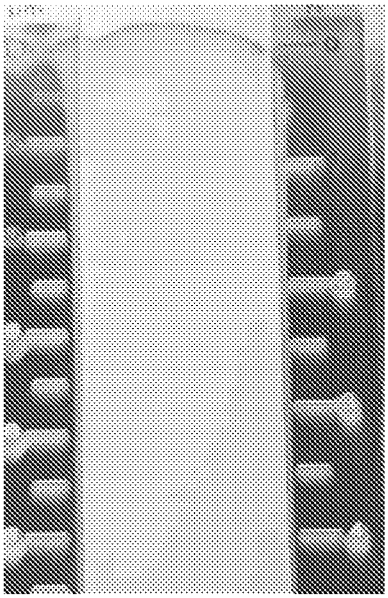
FIG. 1 shows a dispersion of titanium dioxide pigment in a monomer including an exemplary embodiment of the invention.

The following description is merely exemplary in nature and is in no way intended to limit the present disclosure or its application or uses.

In a preferred embodiment, the structure of the polymer is alternating. In another embodiment, structure [C] repeats.

The term "polymer" as used herein is meant to include organic molecules with a number average molecular weight higher than 1,000 Da, or higher than 1,500 Da, or higher than 2,000 Da, or higher than 2,500 Da, or higher than or 5,000 Da, or higher than 50,000 Da as measured by gel permeation chromatography using tetrahydrofuran as solvent and polystyrene of known molecular weight as calibration standards.

The term "(meth)acrylate" is understood to encompass either or both acrylate moieties and methacrylate functional groups.

A (meth)acrylate-functionalized polymer is provided. According to some embodiments, the functionalized polymer may be conveniently prepared by reacting hydroxyl functional reactants with a polymer comprising anhydride functionalized units along its backbone. According to some embodiments, such polymers may comprise styrene-maleic anhydride (SMA) copolymer, for example. According to another embodiment, poly(ethylene-maleic anhydride) copolymers may be functionalized with (meth)acrylate functionality. According to another embodiment, such polymers may comprise copolymers of maleic anhydride and vinyl methyl ether functionalized with (meth)acrylate functionality. According to yet another embodiment, the polymers may comprise copolymers of maleic anhydride and octadecene functionalized with (meth)acrylate functionality. The hydroxyl functionality on a hydroxyl-functionalized (meth) acrylate reacts with the anhydride functionality on the polymer backbone to produce the (meth)acrylate functionalized polymer, in which the (meth)acrylate functionality is pendant to the polymer backbone, and linked thereto with an ester linkage. According to certain embodiments, at least 25-50 molar percent of backbone units in the copolymer, prior to the reaction with one or more hydroxyl functionalized reactants comprise anhydride functionality. For example, from 30%-45%, 35%-50%, 30%-50%, 25%-40%, 45%-50% by moles of the SMA copolymer may comprise, prior to a reaction with a hydroxyl functional reactant, of maleic anhydride units. The number average molecular weight of the base SMA backbone, prior to being functionalized, may be from 1000-50,000 Daltons The SMA base polymer may be a random copolymer or a block copolymer. A random copolymer is preferred. According to some embodiments the molar ratio of styrene or ethylene or vinyl methyl ether or C3-C22 alkenes or other comonomer to maleic anhydride monomers in the base SMA copolymer (or other copolymer) is from 1:1 to 4:1, and is preferably about 1:1. According to certain embodiments, a maleic anhydride-styrene copolymer base resin containing in the backbone an approximate mole ratio of 1.3 moles styrene to 1 mole maleic anhydride having a weight average molecular weight (Mn) of about 2000 Daltons may be functionalized with a (meth)acrylate. The base copolymer thus may have 8 moles of anhydride per chain. According to certain embodiments, one mole of this styrene maleic anhydride resin maybe reacted with 2 to 4 moles of a hydroxyl function (meth) acrylate such as 2-hydroxyethyl acrylate and 1 to 3 moles of hydroxyl functional hydrophilic and/or hydrophobic pendant groups as disclosed in more detail herein.

As used here, the term "organic moiety" is used to signify an organic part of a molecule, e.g. in an ester $R^1COOR_2$ the alcohol moiety is $R_2O$. Organic moieties are understood to mean moieties based on carbon chains or rings and also containing hydrogen with or without oxygen, nitrogen, or other molecules.

Thus, a (meth)acrylate-functionalized polymer is provided. The polymer comprises, consists of, or consists essentially of repeating units of structure [A], repeating units of structure [B], and repeating units of structure [C].

Structure [A] is:

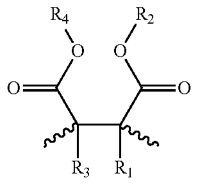

[A]

$R_1$ and $R_3$ are the same or different and are H or alkyl. The alkyl groups $R_1$ or $R_3$ are not particularly limited and may comprise, consist of, or consist essentially of, for example, straight chain or branched, saturated or unsaturated hydrocarbons. Non-limiting examples include C1-C6 hydrocarbons for example. Structure [A] provides the (meth)acrylate functionality for the (meth)acrylate functionalized copolymer.

$R_2$ and $R_4$ are different from each other and are either an organic moiety bearing at least one (meth)acrylate functional group or H. For example, if not H, $R_2$ or $R_4$ may be derived from 2-hydroxyethyl acrylate. For example, besides 2-hydroxyethyl acrylate, $R_2$ or $R_4$ may be derived from hydroxyl propyl acrylate, OH-terminated polycaprolactone including a terminal (meth)acrylate group or other hydroxyl functionalized (meth)acrylates and combinations thereof. According to particular embodiments, one of $R_2$ or $R_4$ may be according to structure (1):

(1)

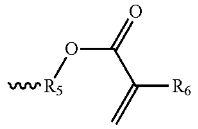

In some embodiments of the invention, $R_5$ may be a divalent alkylene or an oligooxyalkylene or a poly(ester) moiety. An oligooxyalkylene may correspond to a linker comprising a one or more oxyalkylene moieties, in particular one or more moieties selected from oxyethylene, oxypropylene, oxybutylene and mixtures thereof. An oligooxyalkylene may be represented by the following formula $—[(CR^aR^b)_p—O]_q—(CR^aR^b)_p—$, wherein $R^a$ and $R^b$ are independently H or alkyl, p is 2 to 4 and q is at least one. A poly(ester) moiety may be a moiety having a least one ester bond. A poly(ester) moiety may be represented by the following formula $—[(CR^cR^d)_r—C(=O)—O]_s—(CR^cR^d)_t—*$, wherein $R^c$ and $R^d$ are independently H or alkyl, r is 3 to 6, s is at least one, t is 1 to 10 and the symbol * represents the point of attachment to the (meth) acrylate group of structure (1).

According to particular embodiments, $R_5$ may be a poly (ester) moiety comprising caprolactone residues. According to embodiments, $R_6$ may be H or $CH_3$. According to certain embodiments $R_6$ is H. According to other embodiments, $R_5$ may be an ethylene or oligooxyethylene.

Structure [B] is:

[B]

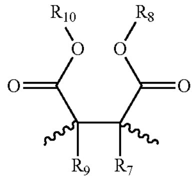

$R_7$ and $R_9$ are the same or different and are H or alkyl.

$R_8$ and $R_{10}$ are different from each other. $R_8$ and $R_{10}$ do not comprise (meth)acrylate functionality, and are independently selected from H or the following:

$—(R_{11}O)_nR_{12}$, wherein $R_{11}$ is a divalent alkylene moiety, $R_{12}$ is H or a C1-C26, in particular C8-C26, alkyl, and n is an integer of 1 or more. For example $R_{12}$ may be a C1 alkyl, such that $R_8$ or $R_{10}$ is a polyalkylene oxide. Such moieties may be derived from hydroxyl terminated polyalkoxylates such as polyethylene glycol 200, polyethylene glycol 300, polyethylene glycol 400, polyethylene glycol 600, polyethylene glycol 1450, polyethylene glycol 3350, polyethylene glycol 8000, polyethylene glycol 350 methyl ether, polyethylene glycol 550 methyl ether, polytetrahydrofuran, and mixtures thereof. It is understood that the number in the preceding recitation refers to the average molecular weight of each respective moiety. According to some embodiments, $R_8$ or $R_{10}$ may comprise, consist of, or consist essentially of polyethylene oxide, or polypropylene oxide or poly (ethylene oxide/propylene oxide) blocks or may comprise ethylene oxide/propylene oxide/hydrocarbon blocks.

$R_{19}$, wherein $R_{19}$ is a C2-C34, in particular C2-C30, more particularly C8-C26, even more particularly C8-C22, branched or straight chained alkyl. For example, in some embodiments, $R_8$ or $R_{10}$ may be derived from a fatty alcohol. Non-limiting examples of such branched or straight chained fatty alcohols include tert-butyl alcohol, tert-amyl alcohol, 3-methyl-3-pentanol, 1-heptanol (enanthic alcohol), 1-octanol (capryl alcohol), pelargonic alcohol (1-nonanol), 1-decanol (decyl alcohol, capric alcohol), undecyl alcohol (1-undecanol, undecanol, hendecanol), lauryl alcohol (dodecanol, 1-dodecanol), tridecyl alcohol (1-tridecanol, tridecanol, isotridecanol), myristyl alcohol (1-tetradecanol), pentadecyl alcohol (1-pentadecanol, pentadecanol), cetyl alcohol (1-hexadecanol), palmitoleyl alcohol (cis-9-hexadecen-1-ol), heptadecyl alcohol (1-n-heptadecanol, heptadecanol), stearyl alcohol (1-octadecanol), oleyl alcohol (1-octadecenol), nonadecyl alcohol (1-nonadecanol), arachidyl alcohol (1-eicosanol), heneicosyl alcohol (1-heneicosanol), behenyl alcohol (1-docosanol), erucyl alcohol (cis-13-docosen-1-ol), lignoceryl alcohol (1-tetracosanol), cetyl alcohol (1-hexacosanol), 1-heptacosanol, montanyl alcohol, cluytyl alcohol, 1-octacosanol, 1-nonacosanolmyricyl alcohol, 1-triacontanol, 1-dotriacontanol, or geddyl alcohol (1-tetratriacontanol). Mixtures of any two or more of these are contemplated.

$—R_{20}—(C=O)OH$ wherein $R_{20}$ is a C2-C26, in particular C8-C26, alkylene. For example, $R_8$ or $R_{10}$ may be derived from a long chain carboxylic acid comprising a terminal hydroxyl group. Non-limiting examples of such reactants are C2-C26, or C2-C22, or C8-C26, carboxylic acid aliphatic alcohols such as 12 hydroxyl lauric acid.

According to particular embodiments of the (meth)acrylate-functionalized polymer, $R_1$, $R_3$, $R_7$, and $R_9$ are each H. According to other embodiments, $R_8$ or $R_{10}$ may be derived from alkoxylated fatty alcohols such as 12 molar ethoxylated tridecyl alcohol, such that $R_{10}$ or $R_8$$=$$—(R_{11}O)_nR_{12}$, and $R_{11}$ is $CH_2CH_2$, $R_{12}$ is a C13 straight chain saturated alkyl, and n=12.

Non-limiting examples of $R_{10}$ or $R_8$ include fatty alcohol alkoxylates. The alkoxylate moiety may comprise, consist of, or consist essentially of ethylene oxide (EO), propylene oxide (PO) or butylene oxide (BO) units or mixtures thereof. The alkoxylate moiety may also be present in the form of ethylene oxide/propylene oxide block copolymer. Fatty alcohol oxyalkylates may also comprise polyglycerolated fatty alcohols. The ethoxylated fatty alcohols, may be primary alcohols having from 8 to 22 carbon atoms, for example coconut, palm fat, palm kernel, tallow fat, lauryl, stearyl or oleyl alcohol. These may comprise from 1 to 80 EO (ethylene oxide) units per mole of alcohol, and the alcohol radical may be linear or may be methyl-branched in the 2-position, or may contain linear and methyl-branched radicals in a mixture, as is typically the case in oxo alcohol radicals. The ethoxylated alcohols may include, for example, C11 alcohols having 3, 5, 7, 8 and 11 EO units, (C12-C15) alcohols having 3, 6, 7, 8, 10 and 13 EO units, (C14-C15) alcohols having 4, 7 and 8 EO units, (C16-C18) alcohols having 8, 11, 15, 20, 25, 50 and 80 EO units and mixtures thereof. The degrees of ethoxylation specified constitute statistical averages which may be an integer or a fraction for a specific product.

According to particular embodiments of the (meth)acrylate functionalized polymer, Ru may be a divalent ethylene or propylene moiety. In some embodiments, of the (meth) acrylate functionalized polymer, $R_{12}$ is a C8-C26 straight chain saturated alkyl. In some embodiments of the (meth) acrylate functionalized polymer, n may be an integer of from 3 to 30. For example, n may be 3, 4, 5, 6, 7, 8, 9, 10, 11, 12, 13, 14, 15, 16, 17, 18, 19, 20, 21, 22, 23, 24, 25, 26, 27, 28, 29, 30. According to some embodiments of the (meth) acrylate-functionalized polymer, $R_{19}$ may be a branched saturated alkyl moiety.

Structure [C] is:

[C]

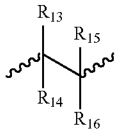

$R_{13}$, $R_{14}$, $R_{15}$, and $R_{16}$ are the same or different and are independently selected from the group consisting of H and organic moieties. Suitable organic moieties include but are not limited to aromatic groups (for example phenyl groups), alkyl groups (for example methyl groups) or alkoxy groups. According to particular embodiments of the (meth)acrylate-functionalized polymer, $R_{13}$ may be phenyl, alpha methyl phenyl, methyl or methoxy, or ethoxy, or any C2-C20 alkyl and $R_{14}$, $R_{15}$ and $R_{16}$ may each be H. According to particular embodiments, $R_{13}$, $R_{14}$, $R_{15}$, and $R_{16}$ may all be H. For example, the (meth)acrylate functionalized polymer disclosed herein may be derived from methyl vinyl ether co-maleic anhydride polymer, such as Gantrez™ copolymers available from Ashland Chemical. According to certain embodiments the (meth)acrylate functional copolymer provided herein is comprise of a base polymer chain that may be derived from a copolymer of maleic anhydride and styrene or methyl vinyl ether or a C2-C22 alkene. For example, other co-monomers suitable for copolymerization with maleic anhydride, or other anhydride functionalized co-monomer may be selected from ethylene, propylene, butene, pentene, hexene, heptene, octane, nonene, decene, undecene, dodecene, tridecene, tetradecene, pentadecene, hexadecene, heptadecene, octadecene, nonadecene, icosene, henicosene, docosene, styrene, alpha-methyl styrene, methyl vinyl ether, isomers thereof, and mixtures thereof.

The (meth)acrylate-functionalized polymer provided is subject to the proviso that structure [C] is different from structure [A] and structure [B] and further, that one or more repeating units of structure [C] are located between at least one of i) two units of structure [A], ii) two units of structure [B] or iii) one unit of structure [A] and one unit of structure [B].

According to other embodiments, the (meth)acrylate-functionalized polymer may be additionally comprised of, consist of, or consist essentially of repeating units of structure [D]. Structure [D] is:

[D]

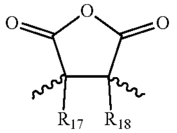

$R_{17}$ and $R_{18}$ may be the same or different and may be selected from H or and may be selected from H or a C1 to C4 alkyl group. Preferably, $R_{17}$ and $R_{18}$ are both H.

According to embodiments of the (meth)acrylate functionalized polymer comprising structural unite [A], [B], [C], and [D], the one or more units of structure [C] may be located between at least one of:

i) two units of structure [A],
ii) two units of structure [B],
iii) two units of structure [D],
iv) one unit of structure [A] and one unit of structure [B],
v) one unit of structure [A] and one unit of structure [D], or
vi) one unit of structure [B] and one unit of structure [D].

For avoidance of doubt, this means that in the chain of the (meth)acrylate-functionalized polymer of the invention, there is at least one of the following repeating units: [A][C][A], [B][C][B], [D][C][D], [A][C][B], [A][C][D], or [B][C][D]. Structure [A] is understood to bear the (meth)acrylate functionality of the (meth)acrylate-functionalized polymer.

The (meth)acrylate-functionalized polymer may be a reaction product of at least i) an anhydride-functionalized base (meth)acrylate-functionalized polymer, ii) a hydroxyl-functionalized (meth)acrylate, and iii) an alkoxylated long chain aliphatic alcohol. The anhydride-functionalized base (meth)acrylate-functionalized polymer may be a co(meth) acrylate-functionalized polymer of maleic anhydride and at least one co-monomer. The at least one co-monomer may be styrene. The ii) hydroxyl-functionalized (meth)acrylate may be selected from the group consisting of hydroxyalkyl (meth)acrylates and alkoxylated hydroxyalkyl (meth)acrylates. The iii) alkoxylated long chain aliphatic alcohol may be an ethoxylate of a C8-C26 aliphatic alcohol.

The (meth)acrylate-functionalized polymer may have a number average molecular weight of from 1000 to 75,000 Daltons. For example, the number average molecular weight may be from 1000 to 50,000 Daltons.

A curable composition comprising the (meth)acrylate-functionalized polymer disclosed herein is provided. The curable composition may comprise the (meth)acrylate-functionalized polymer and an ethylenically unsaturated curable species other than the (meth)acrylate-functionalized polymer. Non-limiting examples of these ethylenically unsaturated curable species may be selected from one or more free radical polymerizable, radiation curable, substantially non-volatile, liquid monomers or oligomers of up to about 2000 molecular weight selected from monethylenically unsaturated materials, polyethlenically unsaturated materials and mixtures thereof. Non-limiting examples of suitable such materials include: lower alkyl esters of acrylic or methacrylic acid including methyl methacrylate, ethyl acrylate, 2-ethylhexyl acrylate, butyl acrylate and isobutyl methacrylate; vinyl esters such as vinyl acetate and vinyl propionate; vinyl halides such as vinyl chloride and vinylidene chloride; and particularly high solvency monomers such as 2,2-ethoxyethoxyethyl acrylate, tetrahydrofurfuryl acrylate, n-laurylacrylate, 2-phenoxyethylacrylate, glycidyl acrylate, glycidyl methacrylate, isodecyl acrylate, isoctyl acrylate, and the like. Other nonlimiting examples of monoethylenically unsaturated reactive diluents include vinyl aromatics such as styrene, alphamethylstyrene, vinyl toluene, indene and p-tert butyl styrene; ethylenically unsaturated acids such as fumaric acid, maleic anhydride and the esters thereof; and nitrogen containing monomers such as acrylonitrile, methacrylonitrile, acrylamide, methacrylamide, N,N-dimethylacrylamide, N-vinylpyrrolidine, N-vinylcaprolactam, and the like. Non-limiting examples of polyethylenically unsaturated reactive diluents include polyol polyacrylates and polymethacrylates, such as alkane (C2-C16) diol diacrylates, aliphatic (C2-C16) polyacrylates, alkoxylated aliphatic polyacrylates, polyether glycol diacrylates and the like. Other non-limiting examples are 1,6-hexanediol diacrylate, neopentyl glycol diacrylate, 1,3-butylene glycol diacrylate, tripropylene glycol diacrylate, polyethylene glycol 200 diacrylate and tetraethylene glycol diacrylate. Other polyunsaturated reactive diluents are allyl acrylates such allylmethacrylate and diallylmethacrylate; acrylated epoxies, aminoplast acrylates and unsaturated polyesters; trimethylol propane based polyacrylates such as trimethylolpropane triacrylate; pentaerythritol-based polyacrylates or polymethacrylates; acrylic oligomers; acrylated polymer or oil such as acrylated epoxidized drying-type oils, acrylated bisphenol A/epoxy resins, ethoxylated bisphenol A diacrylate, acrylated urethane prepolymers (also known as “acrylated polyurethanes”), polyethers, silicones, and the like.

The curable composition may further comprise a matrix which is liquid at 25° C. in which solid particles of a substance are dispersed. Non-limiting examples of such matrices are water, organic solvents and mixtures thereof. The solid particles of the substance may be selected from the group consisting of fillers, pigments, inorganic pigments. Non-limiting examples of such fillers, pigments and inorganic pigments are metal oxides, such as titanium dioxide, zinc oxide, or iron oxide, as well as organic pigments, or combinations thereof. Non-limiting examples of pigments are precipitated salts of pigments containing sulfonic acid and/or carboxylic acid groups precipitated with an alkaline-earth metal or manganese. Such pigments include, but are not limited to: Beta Napthol pigment lakes such as Pigment Red 49 (Red 49:1 and Red 49:2), Red 50:1, Red 51, Red 53 (Red 53:1 and Red 53:3), Red 68, Orange 16, Orange 17:1, Orange 46; BONA Pigment Lakes such as Red 48:1, Red 48:2, Red 48:3, Red 48:4, Red 48:5, Red 52:1, Red 52:2, Red 57:1, Red 58:2, Red 58:4, Red 63:1, Red 63:2, Red 64, Red 64:1, Red 200, Brown 5; Napthol AS Pigment Lakes such as Red 151, Red237, Red 239, Red 240, Red 243, Red 247, Naphthalene Sulfonic Acid Pigment Lakes such as Yellow 104, Orange 19, Red 60, Red 66, Red 67. Examples of fillers may include, but not be limited to, calcium carbonate, nepheline syenite, feldspar, diatomaceous earth, talc, aluminosilicates, silica, alumina, clay, kaolin, mica, pyrophyllite, perlite, baryte, or Wollastonite, and combinations thereof.

A method of dispersing solid particles of the substance in the liquid matrix comprised of one or more ethylenically unsaturated curable species is provided. The method comprises incorporating an effective amount of at least one (meth)acrylate-functionalized polymer disclosed herein in the liquid matrix and grinding the mixture with grinding equipment (three roll mill, media mill, cowles blade.

Exemplary aspects of the present invention may be summarized as follows:

Aspect 1: A (meth)acrylate-functionalized polymer comprising at least one unit structure [A], at least one unit of structure [B], and at least one unit of structure [C], wherein:

structure [A] is:

[A]

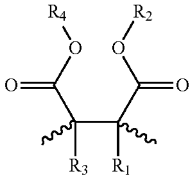

wherein $R_1$ and $R_3$ are the same or different and are H or alkyl, $R_2$ and $R_4$ are different and are either an organic moiety bearing at least one (meth)acrylate functional group or H;

structure [B] is:

[B]

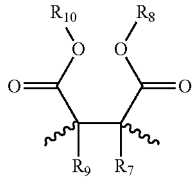

wherein $R_7$ and $R_9$ are the same or different and are H or alkyl, $R_8$ and $R_{10}$ are different and are independently selected from:

$(R_{11}O)$, $R_{12}$, wherein $R_{11}$ is a divalent alkylene moiety, $R_{12}$ is a C8-C26 alkyl, and n is an integer of 1 or more;

$R_{19}$ wherein $R_{19}$ is a C2-C30 branched or straight chained alkyl;

$R_{20}$ (C═O)OH wherein $R_{20}$ is a C8-C26 branched or straight chained alkyl; or

H;

and structure [C] is:

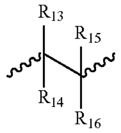

wherein $R_{13}$, $R_{14}$, $R_{15}$, and $R_{16}$ are the same or different and are independently selected from the group consisting of H and organic moieties, subject to the proviso that structure [C] is different from structure [A] and structure [B]; and wherein one or more repeating units of structure [C] are located between at least one of i) two units of structure [A], ii) two units of structure [B], or iii) one unit of structure [A] and one unit of structure [B].

Aspect 2: The (meth)acrylate-functionalized polymer of Aspect 1, wherein the (meth)acrylate-functionalized polymer is additionally comprised of repeating units of structure [D] and structure [D] is:

[D]

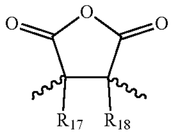

wherein $R_{17}$ and $R_{18}$ may be the same or different and may be selected from H or an C1 to C4 alkyl group.

Aspect 3: The (meth)acrylate-functionalized polymer of either Aspect 1 or Aspect 2, wherein the one or more repeating units of structure [C] are located between at least one of:

i) two units of structure [A], ii) two units of structure [B], iii) two units of structure [D], iv) one unit of structure [A] and one unit of structure [B], v) one unit of structure [A] and one unit of structure [D], or vi) one unit of structure [B] and one unit of structure [D].

Aspect 4: The (meth)acrylate-functionalized polymer of any of Aspects 1-3, wherein one of $R_2$ or $R_4$ is

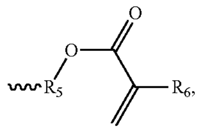

wherein $R_5$ is a divalent alkylene or an oligooxyalkylene or a poly(ester) moiety and $R_6$ is H or $CH_3$.

Aspect 5: The (meth)acrylate-functionalized polymer of Aspect 4, wherein $R_5$ is a poly(ester) moiety comprising caprolactone residues.

Aspect 6: The (meth)acrylate-functionalized polymer of Aspect 4 or Aspect 5, wherein $R_6$ is H.

Aspect 7: The (meth)acrylate-functionalized polymer of any of Aspects 1-6, wherein $R_1$, $R_3$, $R_7$, and $R_9$ are each H.

Aspect 8: The (meth)acrylate-functionalized polymer of any of Aspects 4, 6 or 7, wherein $R_5$ is an ethylene or oligooxyethylene.

Aspect 9: The (meth)acrylate-functionalized polymer of any of Aspects 1-8, wherein $R_{13}$ is phenyl or methoxy or C16 alkyl and $R_{14}$, $R_{15}$ and $R_{16}$ are each H.

Aspect 10: The (meth)acrylate-functionalized polymer of any of Aspects 1-9, wherein $R_{11}$ is a divalent ethylene or propylene moiety.

Aspect 11: The (meth)acrylate-functionalized polymer of any of Aspects 1-10, wherein $R_{12}$ is a C8-C26 straight chain saturated alkyl.

Aspect 12: The (meth)acrylate-functionalized polymer of any of Aspects 1-11, wherein n is an integer of 3 to 30.

Aspect 13: The (meth)acrylate-functionalized polymer of any of Aspects 1-12, wherein $R_{19}$ is a branched saturated alkyl.

Aspect 14: The (meth)acrylate-functionalized polymer of any of Aspects 1-13, having a number average molecular weight of from 1000 to 50,000 Daltons.

Aspect 15: A curable composition, wherein the curable composition is comprised of a (meth)acrylate-functionalized polymer in accordance with any of Aspects 1-14 and an ethylenically unsaturated curable species other than the (meth)acrylate-functionalized polymer in accordance with claim 1.

Aspect 16: The curable composition of Aspect 15, wherein the curable composition is comprised of a matrix which is liquid at 25° C. in which solid particles of a substance are dispersed.

Aspect 17: The curable composition of either Aspect 15 or Aspect 16, wherein the substance is selected from the group consisting of fillers, pigments, and inorganic pigments.

Aspect 18: A method of dispersing solid particles of a substance in a liquid matrix comprised of one or more ethylenically unsaturated curable species, wherein the method comprises incorporating an effective amount of at least one (meth)acrylate-functionalized polymer in accordance with any of Aspects 1-14 in the liquid matrix.

Aspect 19: A (meth)acrylate-functionalized polymer, wherein the (meth)acrylate-functionalized polymer is a reaction product of at least i) an anhydride-functionalized base (meth)acrylate-functionalized polymer, ii) a hydroxyl-functionalized (meth)acrylate, and iii) an alkoxylated long chain aliphatic alcohol.

Aspect 20: The (meth)acrylate-functionalized polymer of Aspect 19, wherein the anhydride-functionalized base (meth)acrylate-functionalized polymer is a co(meth)acrylate-functionalized polymer of maleic anhydride and at least one co-monomer.

Aspect 21: The (meth)acrylate-functionalized polymer of either Aspect 19 or Aspect 20, wherein the hydroxyl-functionalized (meth)acrylate is selected from the group consisting of hydroxyalkyl (meth)acrylates and alkoxylated hydroxyalkyl (meth)acrylates.

Aspect 22: The (meth)acrylate-functionalized polymer of any of Aspects 19-21, wherein the alkoxylated long chain aliphatic alcohol is an ethoxylate of a C8-C26 aliphatic alcohol.

Within this specification, embodiments have been described in a way which enables a clear and concise specification to be written, but it is intended and will be appreciated that embodiments may be variously combined or separated without departing from the invention.

For example, it will be appreciated that all preferred features described herein are applicable to all aspects of the invention described herein.

In some embodiments, the invention herein can be construed as excluding any element or process step that does not materially affect the basic and novel characteristics of the curable compositions, materials, products and articles prepared therefrom and methods for making and using such curable compositions described herein. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1: Preparation of an Acrylate Functional Dispersant

The apparatus used for the synthesis was a 500 ml round bottom flask with a bushing and stirrer shaft/blade inserted into the center joint a condenser inserted into one side joint, a thermocouple inserted into a second side joint and a dry air sparge inserted into a third side joint. The stirrer shaft was attached to a stirrer motor. A heating mantle was placed under the flask and controlled by a temperature controller. Added to the flask were: 62.5 grams of diethylene glycol diacrylate, 36.5 grams of 2-hydroxyethyl acrylate, 74.6 grams of 12 mole ethoxylated tridecyl alcohol, 0.25 grams of 4-methoxyphenol, 0.25 grams of BHT and 0.23 grams of stannous octoate. The mixture was agitated and heated to 50° C. Then 138.2 grams of SMA® 1000 (styrene-maleic anhydride copolymer from Cray Valley) resin was slowly added. After the SMA® 1000 resin was added and dispersed, the mixture was heated to 95° C. The temperature was at 95° C. for 6 hours, then samples were taken every hour for acid value determination. When the acid value was <139 mg KOH/gm, the reaction mixture was cooled to 65° C., then the agitation and air sparge were stopped. The resulting polymer had the structure of repeating units of [A], [B], [C], and [D] where [A] [B] [C], and [D] are described above and:

[A]: $R_1$=$R_2$=$R_3$=H; and $R_4$=ethyl acrylate.

[B]: $R_7$=$R_8$=$R_9$=H; $R_{10}$=—$(R_{11}O)_nR_{12}$, and $R_{11}$ is $CH_2CH_2$, $R_{12}$ is a C13 straight chained saturated alkyl, and n=12.

[C]: $R_{14}$=phenyl; and $R_{13}$=$R_{15}$=$R_{16}$=H.

[D]: $R_{17}$=$R_{18}$=H.

Figure 2:
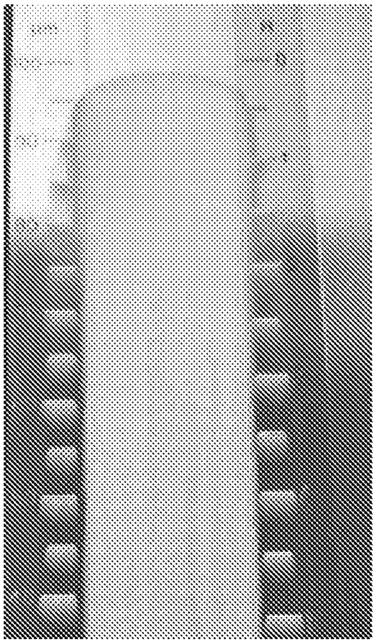
FIG. 2 shows a dispersion of titanium dioxide pigment in a monomer without an embodiment of the dispersant of the invention.

Example 2: Effectiveness of Acrylate Functional Polymer of Example 1 as a Dispersant SR238B solvent (1,6-hexanediol diacrylate available from Sartomer Americas) (8 gr) having a viscosity of 6 cPs and the polymer prepared in Example 1 as dispersant (0.2 gr) were mixed together in a room temperature water sonicator for 3 minutes until the dispersant prepared in Example 1 was completely dissolved in the monomer SR238B. $TiO_2$ (2 gr) was added subsequently followed by another 3 min of sonication. The mixture was placed in a grind gauge and visually inspected for how evenly the $TiO_2$ was dispersed in the monomer without further grinding. The results are shown in the FIGS. 1 and 2. As seen in FIG. 1, the mixture including about 2 wt % of the acrylate functional polymer prepared in Example 1 did not affect the viscosity of the solution and showed better dispersion of the 20 wt % $TiO_2$ compared to a control mixture as shown in FIG. 2 not including the inventive dispersant.

The invention claimed is:

1. A (meth)acrylate-functionalized polymer comprising at least one unit of structure [A], at least one unit of structure [B], and at least one unit of structure [C], wherein:

structure [A] is:

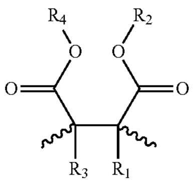

[A]

wherein $R_1$ and $R_3$ are the same or different and are H or alkyl, $R_2$ and $R_4$ are different and are either an organic moiety bearing at least one (meth)acrylate functional group or H;

structure [B] is:

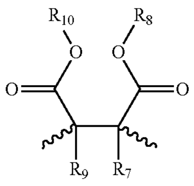

[B]

wherein $R_7$ and $R_9$ are the same or different and are H or alkyl, one of $R_8$ and $R_{10}$ is H, and the other of $R_8$ or $R_{10}$ is —$(R_{11}O)_nR_{12}$, wherein $R_{11}$ is a divalent alkylene moiety, $R_{12}$ is a C8-C26 alkyl, and n is an integer of more than 1;

and structure [C] is:

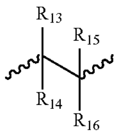

[C]

wherein $R_{13}$, $R_{14}$, $R_{15}$, and $R_{16}$ are the same or different and are independently selected from the group consisting of H and organic moieties, subject to the proviso that structure [C] is different from structure [A] and structure [B]; and wherein one or more repeating units of structure [C] are located between at least one of i) two units of structure [A], ii) two units of structure [B], or iii) one unit of structure [A] and one unit of structure [B].

2. The (meth)acrylate-functionalized polymer of claim 1, wherein the (meth)acrylate-functionalized polymer is additionally comprised of repeating units of structure [D] and structure [D] is:

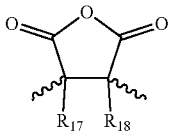

[D]

wherein $R_{17}$ and $R_{18}$ may be the same or different and may be selected from H or an C1 to C4 alkyl group.

3. The (meth)acrylate-functionalized polymer of claim 1, wherein the one or more repeating units of structure [C] are located between at least one of:

i) two units of structure [A], ii) two units of structure [B], iii) two units of structure [D], iv) one unit of structure [A] and one unit of structure [B], v) one unit of structure [A] and one unit of structure [D], or vi) one unit of structure [B] and one unit of structure [D].

4. The (meth)acrylate-functionalized polymer of claim 1, wherein one of $R_2$ or $R_4$ is

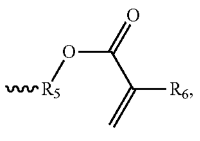

wherein $R_5$ is a divalent alkylene or an oligooxyalkylene or a poly(ester) moiety and $R_6$ is H or $CH_3$.

5. The (meth)acrylate-functionalized polymer of claim 4, wherein $R_5$ is a poly(ester) moiety comprising caprolactone residues.

6. The (meth)acrylate-functionalized polymer of claim 4, wherein $R_6$ is H.

7. The (meth)acrylate-functionalized polymer of claim 1, wherein $R_1$, $R_3$, $R_7$, and $R_9$ are each H.

8. The (meth)acrylate-functionalized polymer of claim 4, wherein $R_5$ is an ethylene or oligooxyethylene.

9. The (meth)acrylate-functionalized polymer of claim 1, wherein $R_{13}$ is phenyl, alpha methyl phenyl, methyl, methoxy, ethoxy, or C2-C20 alkyl and $R_{14}$, $R_{15}$ and $R_{16}$ are each H.

10. The (meth)acrylate-functionalized polymer of claim 1, wherein $R_{11}$ is a divalent ethylene or propylene moiety.

11. The (meth)acrylate-functionalized polymer of claim 1, wherein $R_{12}$ is a C8-C26 straight chain saturated alkyl.

12. The (meth)acrylate-functionalized polymer of claim 1, wherein n is an integer of 3 to 30.

13. The (meth)acrylate-functionalized polymer of claim 1 having a number average molecular weight of from 1000 to 50,000 Daltons.

14. A curable composition, wherein the curable composition is comprised of a (meth)acrylate-functionalized polymer in accordance with claim 1 and an ethylenically unsaturated curable species other than the (meth)acrylate-functionalized polymer in accordance with claim 1.

15. The curable composition of claim 14, wherein the curable composition is comprised of a matrix which is liquid at 25° C. in which solid particles of a substance are dispersed.

16. The curable composition of claim 15, wherein the substance is selected from the group consisting of fillers, pigments, and inorganic pigments.

17. A method of dispersing solid particles of a substance in a liquid matrix comprised of one or more ethylenically unsaturated curable species, wherein the method comprises incorporating an effective amount of at least one (meth) acrylate-functionalized polymer in accordance with claim 1 in the liquid matrix.

* * * * *